United States Patent
Pandis et al.

(10) Patent No.: US 10,067,678 B1
(45) Date of Patent: Sep. 4, 2018

(54) PROBABILISTIC EVICTION OF PARTIAL AGGREGATION RESULTS FROM CONSTRAINED RESULTS STORAGE

(71) Applicant: Amazon Technologies, Inc., Seattle, WA (US)

(72) Inventors: Ippokratis Pandis, Menlo Park, CA (US); Yannis Papakonstantinou, La Jolla, CA (US)

(73) Assignee: Amazon Technologies, Inc., Seattle, WA (US)

( * ) Notice: Subject to any disclaimer, the term of this patent is extended or adjusted under 35 U.S.C. 154(b) by 70 days.

(21) Appl. No.: 15/389,316

(22) Filed: Dec. 22, 2016

(51) Int. Cl.
   *G06F 3/06* (2006.01)
   *G06F 12/12* (2016.01)

(52) U.S. Cl.
   CPC .......... *G06F 3/0608* (2013.01); *G06F 3/067* (2013.01); *G06F 3/0652* (2013.01); *G06F 3/0659* (2013.01); *G06F 12/12* (2013.01); *G06F 2212/1044* (2013.01); *G06F 2212/69* (2013.01)

(58) Field of Classification Search
   None
   See application file for complete search history.

(56) References Cited

U.S. PATENT DOCUMENTS

| | | | |
|---|---|---|---|
| 5,511,190 A * | 4/1996 | Sharma | G06F 17/30489 |
| 6,434,544 B1 | 8/2002 | Bakalash et al. | |
| 6,549,934 B1 * | 4/2003 | Peterson | H04L 49/90 709/203 |
| 7,315,849 B2 | 1/2008 | Bakalash et al. | |
| 7,469,241 B2 | 12/2008 | Bellamkonda et al. | |
| 2006/0116989 A1 * | 6/2006 | Bellamkonda | G06F 17/30489 |

* cited by examiner

Primary Examiner — Denise Tran
(74) Attorney, Agent, or Firm — Robert C. Kowert; Meyertons, Hood, Kivlin, Kowert & Goetzel, P.C.

(57) ABSTRACT

Probabilistic eviction of partial aggregation results may be implemented for aggregation operations performed using constrained result storage. An aggregation operation request may be received from a client and executed by scanning and applying the aggregation operation to data retrieved by scanning a data store. Partial aggregation results that are generated while executing the aggregation operation may be stored in a result store. If a partial aggregation result is generated when no further storage space in the result store is available, then one or more currently stored partial aggregation results may be evicted according to a reoccurrence probability so that the new partial aggregation result may be stored in the result store. The evicted partial aggregation results may be sent to the client.

20 Claims, 6 Drawing Sheets

US 10,067,678 B1

PROBABILISTIC EVICTION OF PARTIAL AGGREGATION RESULTS FROM CONSTRAINED RESULTS STORAGE

BACKGROUND

Processing large amounts of data is an integral part of many types of systems, services, and applications. In order to provide quick and efficient operations with respect to data, computing resources may need to be managed to optimally distribute the work that is performed by different data processing components. For example, the performance location of different data manipulation operations may offer opportunities for performance improvements. If the amount of data that needs to be transported from one location to another could be reduced by performing certain operations (e.g., filtering or aggregating data) in locations that are closely located to data (e.g., via direct attached storage devices), then the burden on transportation bandwidth to, and computing resources at, the recipient could be reduced.

Figure 1:
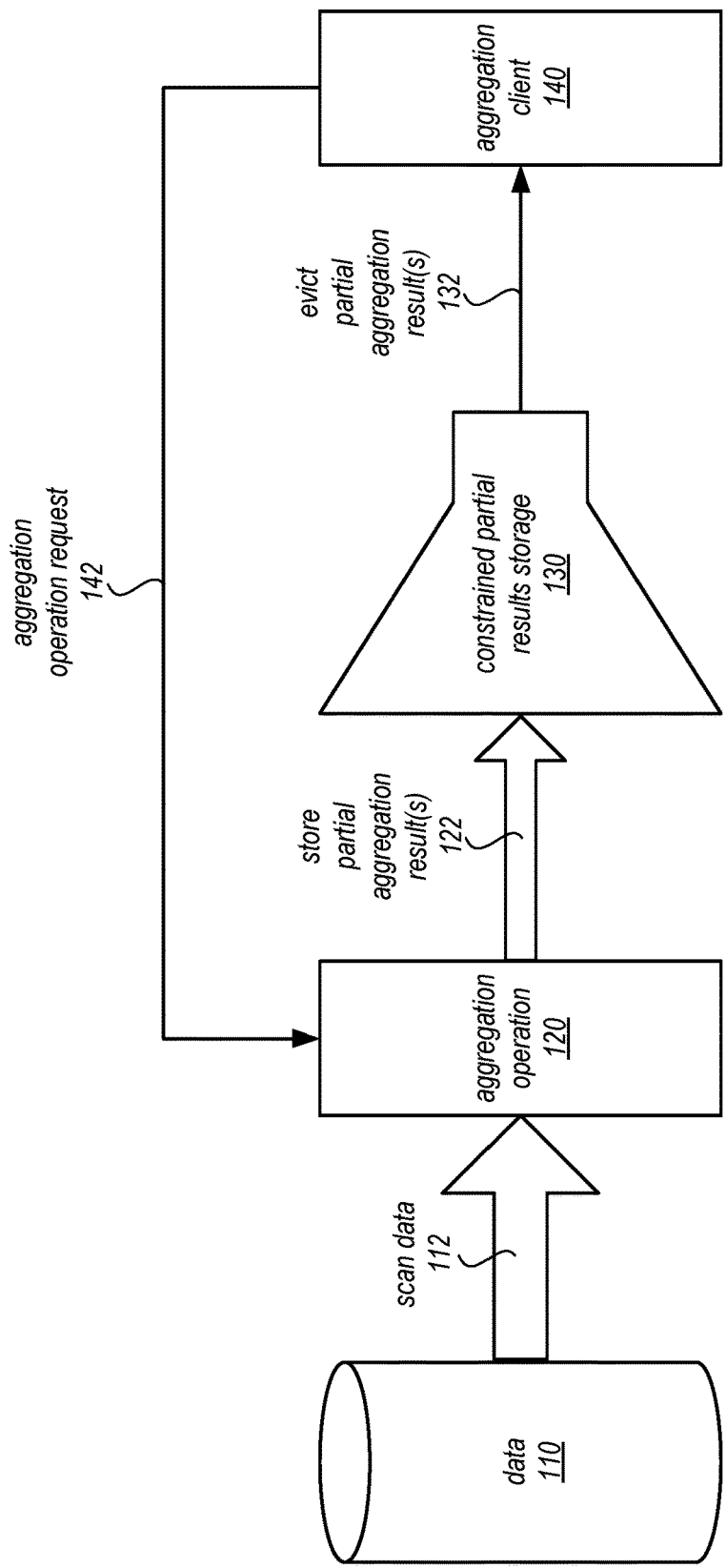
FIG. 1 illustrates a logical block diagram of probabilistic eviction of partial aggregation results from constrained results storage, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of probabilistic eviction of partial aggregation results from constrained results storage are described herein. Data aggregation may be performed to reduce the amount of data to be transmitted between storage (e.g., on persistent storage devices, such as hard disk drives) and separate clients that access the storage (e.g., a directly attached computer or a remotely connected computer over a network). Data aggregation may also be performed as part of analyzing or evaluating data. For example, statistical calculations such as averages or standard deviation of values may offer useful insights into the variance within a data set.

Because of the variety of benefits aggregation offers, data aggregation techniques are often implemented as part of storage systems that provide access to stored data. For example, database systems may implement operations which may be invoked by a client to perform different aggregation operations over data stored in a database. However, aggregation may be performed in some scenarios where the resources for performing an aggregation operation may be limited. If, for instance, a computer performing aggregation upon data stored in storage device on behalf of client of the computer has limited memory space available to store the results of the aggregation operation while the aggregation operation is being performed (e.g., partial results), the types of aggregation operations that may be performed could be limited to those that "fit" within the memory constrains of the aggregating computer. Alternatively, the aggregating computer could shift some of the aggregation burden to the client computer by sending partial results when storage space is needed to the client computer.

Sending partial results to the client computer could allow the aggregating computer to continue the aggregation operation without data loss (due to lack of results storage space), but sending partial results to the client computer would also result in shifting some the computational burden to the client computer. Probabilistic eviction of partial aggregation results may be implemented in various embodiments to optimize the partial aggregation results sent to a client. In this way, the transmission burden and processing burden imposed on a client that receives partial aggregation results could be minimized.

FIG. 1 illustrates a logical block diagram of probabilistic eviction of partial aggregation results from constrained results storage, according to some embodiments. Data 110 may be a single data object or set of data objects, records, files, tables, or other data structures that may be accessed by an aggregation client, such as aggregation client 140. Aggregation client 140 may interact with data 110 to request various aggregation operations 142 in order to execute client tasks (e.g., perform analytical analysis, generate dynamic content, monitor for events described in the data, etc.). Aggregation operation 120 may be a computer connected to storage devices hosting data 110, a dedicated hardware component implemented as part of storage devices hosting data 110, or any other device that can access data 110 and apply the requested aggregation operation to data 110. Aggregation results may be stored in constrained partial results storage 130 as they are generated by aggregator 120.

Aggregation operations may be any operation or function that is applied to associated items in data 110. For example, associated items may be entries in a table that have a common data field (e.g., column) value, such as the same user identifier. The associated relationship for the applying the aggregation operation may be defined as part of the aggregation operation request 142. For example, a structured query language (SQL) formatted aggregation operation request may include a "GROUP BY" clause which defines the column field upon which associated items are determined (e.g., "GROUP BY user_id" would result in an aggregation operation that aggregates based on user_id). Different aggregation operations include, but are not limited to, summation, average, standard deviation, minimum value, or maximum value).

Aggregation operations may be applied in streaming or scanning fashion, applying the function to data as it is scanned 112. For example, individual entries may be read from a table and processed one entry at time, applying the aggregation operation to the entry on data values in the entry (e.g., incrementing the summary counts for the associated items, updating the average for the associated items, etc.). The partial aggregation results 122 generated from applying the aggregation operation at aggregator 120 in streaming or scanning fashion are stored in constrained partial results storage 130. Constrained partial results storage 130 may have a limited storage space available for maintaining partial aggregation results (e.g., the counts for summations of different associated items). If, as noted above, the aggregation operation results in a large number of distinct associated items (e.g., aggregation by last name), then the number of distinct aggregation results may exceed the storage capacity for constrained results storage 130. For example, constrained partial results storage 130 may be implemented as a memory device (e.g., such as memory 1020 in FIG. 6 that is discussed below), which would have limited storage space for storing unique values from large storage devices (e.g., disk-based storage devices) that store data 110.

Probabilistic eviction of partial results from constrained partial results storage 130 may be performed in order to make storage space available for new partial aggregation results. A reoccurrence probability may be determined or estimated for results currently residing in constrained results storage 130. Reoccurrence probability may indicate the likelihood that the partial aggregation result will be updated by another associated item in the table (e.g., the count increased for a particular user id). If an evicted result were then to be updated by another associated item in data 110, then that update would eventually have to be combined with an evicted partial aggregation result at aggregation client 140, increasing both the amount of data transmitted (e.g., 2 transmissions as opposed to 1) and the workload at aggregation client 140 (e.g., work to track and apply additional updates to the evicted result). Different techniques for determining and/or selecting partial aggregation results to evict may be performed, such as the bucket-based approach discussed below with regard to FIG. 3, as well as various other techniques described below with regard to FIG. 5.

Please note that the previous description of probabilistic eviction of aggregation results is a logical illustration and thus is not to be construed as limiting as to the implementation of storage for a data set, an aggregator, constrained results storage or an aggregation client. For example, aggregator 120 and constrained results storage 130 may be implemented as part of a storage device storing data 110 or at a separate computing device.

This specification begins with a general description of an aggregation agent that implements probabilistic eviction of partial aggregation results from constrained results storage. Then various examples of a probabilistic eviction techniques, as well as interactions among components performing probabilistic eviction techniques are discussed. A number of different methods and techniques to implement probabilistic eviction of partial aggregation results from constrained results storage are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
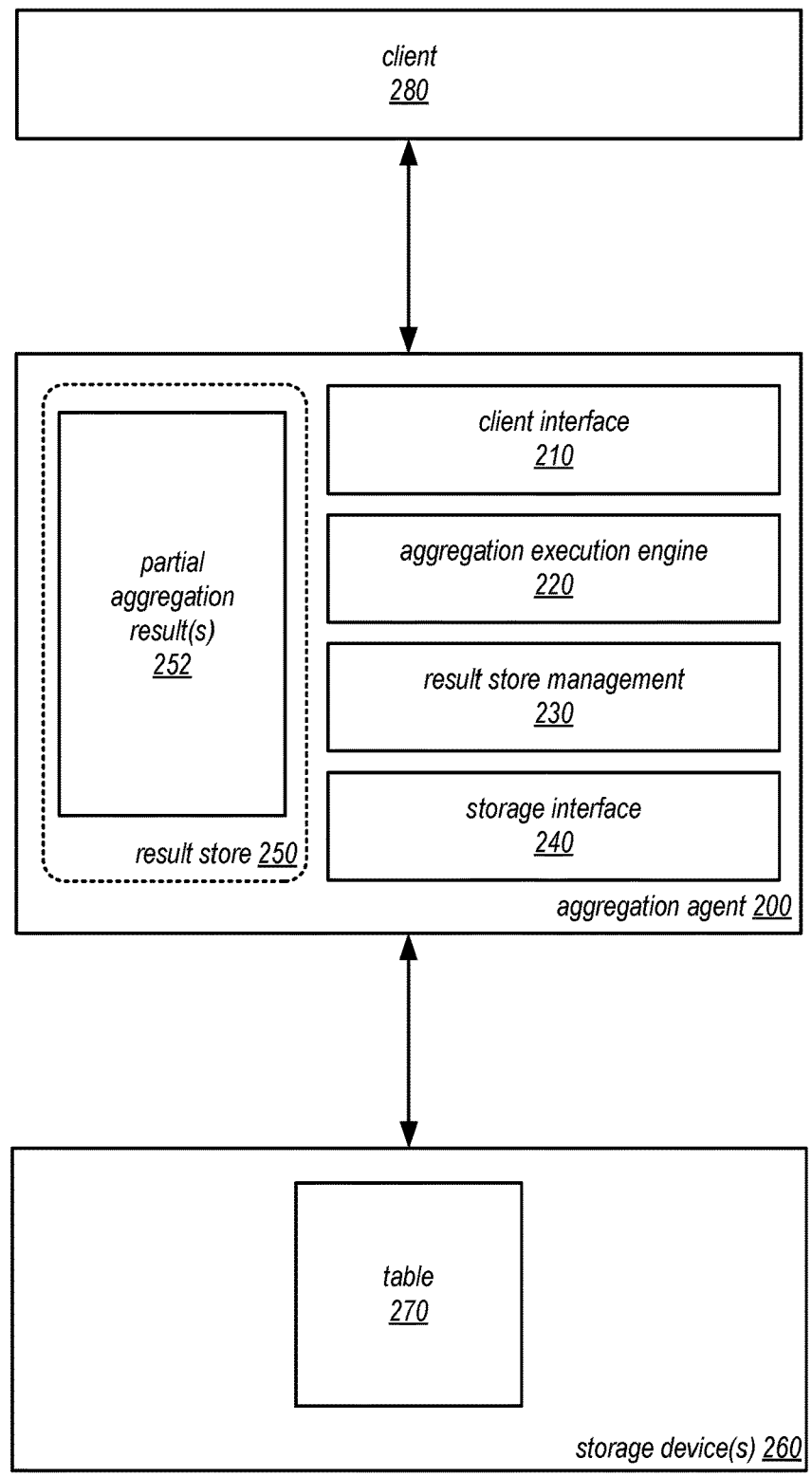
FIG. 2 is a logical block diagram illustrating an aggregation agent that implements probabilistic eviction of partial aggregation results from constrained results storage, according to some embodiments.

FIG. 2 is a logical block diagram illustrating an aggregation agent that implements probabilistic eviction of partial aggregation results from constrained results storage, according to some embodiments. Aggregation agent 200 may be implemented as part of a computing device, such as computing system 1000 discussed below with regard to FIG. 6, or as part of a storage device (e.g., as part of a controller or other dedicated hardware/firmware/software onboard the storage device that processes aggregation operations). Aggregation agent 200 may interact with both a client 280 that submits aggregation operations to aggregation agent 200 via client interface 210 and one or more storage device(s) 260 via storage interface 240. Results for executing aggregation operations may be maintained in result store 250 (which may be implemented by a persistent or non-volatile storage device or a volatile storage device, such as a random access memory device.

Aggregation agent 200 may implement client interface 210 to receive, interpret, dispatch, and/or parse aggregation operation requests. For example, an aggregation operation request may include in identifier for the data to be aggregated, such as an identifier for table 270, an association between items in the table upon which the aggregation operation is to be applied, and the aggregation operation type (e.g., summation, average, deviation, minimum value, maximum value, etc.). In some embodiments, interface 210 may be implemented as a programmatic interface (e.g., an Application Programming Interface (API)). In some embodiments, device specific commands (e.g., that may be submitted by a compatible client interface, such as a device driver) may specify aggregation operations to be performed.

Aggregation agent 200 may implement aggregation execution engine 220 which may receive the aggregation operation request and execute the aggregation operation. For example, aggregation execution engine may initiate read requests to storage device(s) 260 to read entries from table 270 via storage interface 270 in order to apply the aggregation operation to each entry, performing a single-pass scan all entries in table 270 (although in other embodiments, multiple scans of data may be performed). Aggregation execution engine 270 may maintain operation state information as well as recovery or retry information (e.g., the entries which have and have not been processed). Aggregation execution engine may generate partial aggregation results which either update existing partial aggregation results 252 in result store 250 or require creation of a new aggregation result, which may trigger an eviction of one or more current results by result storage management 230. Aggregation execution engine 220 may detect completion of the scanning or reading of entries from table 270 and send the remaining partial aggregation results 252 that have not been reported to client 280.

Aggregation agent 200 may implement storage interface 240 to provide access to data stored in storage device(s) 260. For example, storage interface 240 may be a storage device driver or other storage device interface component (e.g., implemented as part of an operating system or execution platform the runs aggregation agent 200). Storage interface 240 may interpret and execute read requests from aggregation execution engine 220 and transmit them to storage device(s) 260 to retrieve the desired entries of table 270.

Aggregation agent 200 may also implement result storage management 230 which may handle updates, insertions, and evictions for partial aggregation results(s) 252 stored in results storage 250. For partial results generated by aggregation execution engine 220, result store management 230 may identify whether the partial aggregation result updates a current partial result 252 or is a new partial result (for a different associated item, such as a summation maintained for a previously unprocessed user identifier). Upon recognizing the partial aggregation result as an update, the result store management 230 may apply the update to the corresponding result 252 (e.g., increase the counter for the user identifier that is already stored in the partial aggregation result(s) 252). For partial aggregation results that do not update an existing partial result 252, result storage management 230 may determine whether an eviction should be performed. For example, result store management 230 may track available storage space by tracking the number of stored partial results. The constraint on result store 250 may be a limitation on the number of stored partial results 252 that may be stored at a time, when new aggregation result is received that would exceed the number limitation, then result store management 230 may select result(s) for eviction.

Result storage management 230 may select partial result(s) 252 to evict based on a reoccurrence probability for partial aggregation results(s) 252. As noted earlier, reoccurrence probability may indicate the likelihood that an aggregation result will be updated as a result of evaluating another item of data (e.g., by an entry in table 270 that has not yet been scanned by aggregation execution engine 220). Reoccurrence probability may be determined in various ways. For example, result store management 230 may maintain a most recent update time for each partial result 252. A reoccurrence probability may be determined based on a least recently used (LRU) theory that the partial result 252 with the longest time since last update is least likely to reoccur in a subsequent result generated by aggregation execution engine 220. Therefore, the partial result 252 with the longest time since last update, the least recently used result, may be evicted from result store 250 (by sending the partial aggregation result to client 280 via client interface 210). Other techniques may be implemented to determine, estimate or infer reoccurrence probability for either results individually or one or more results relative to other results). Other techniques, such as those techniques discussed below with regard to FIGS. 3 and 5, may be implemented by result store management 230.

Figure 3:
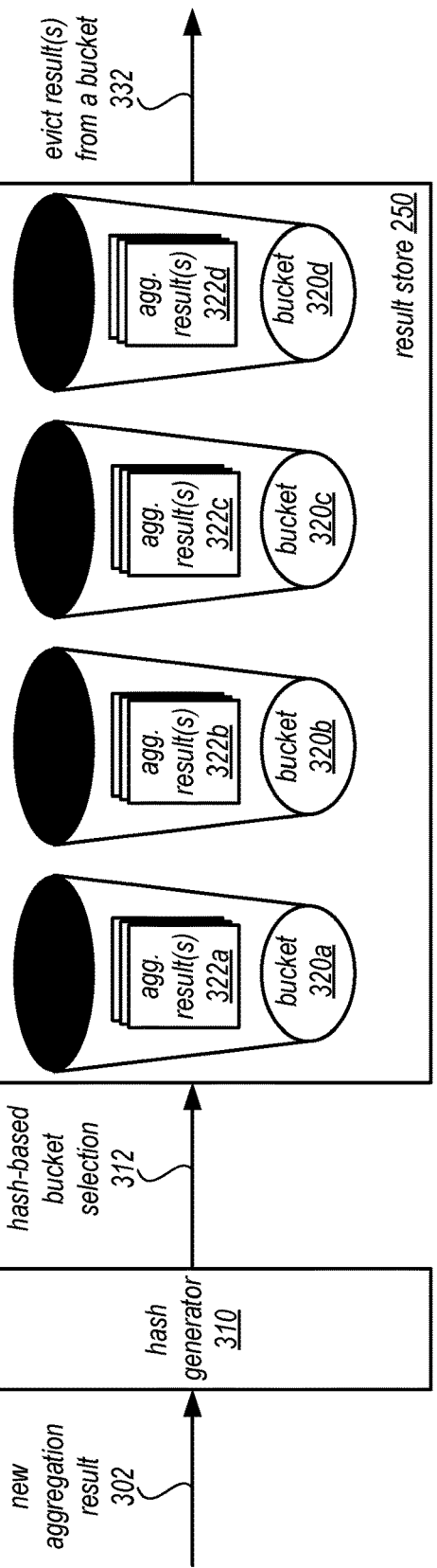
FIG. 3 is a logical block diagram illustrating a probabilistic eviction selection technique for partial aggregation results in a result store, according to some embodiments.

FIG. 3 is a logical block diagram illustrating a probabilistic eviction selection technique for partial aggregation results in a result store, according to some embodiments. Result store 250 may be organized into buckets, such as buckets 320*a*, 320*b*, 320*c*, and 320*d*. When a new aggregation result 302 is generated, a hash generator 310 may generate a hash value for the new aggregation result. For example, the associative value (e.g., user identifier or last name) may be used as a key or input into a hash function, such as secure hash algorithm 1 (SHA-1) or message digest algorithm 5 (MD5). The output hash value may then be mapped to one the buckets 320. For instance, each bucket may be mapped to a non-overlapping range of possible hash values so that a hash value generated for a result may be mapped to one of the buckets 320. Note that in some embodiments, different mappings, other than those based on hash values, between partial aggregation results and buckets may be implemented and thus the previous example is not intended to be limiting.

Once the bucket is identified, a determination may be made as to whether the aggregation result(s) mapped to the bucket, such as aggregation results 322*a*, 322*b*, 322*c*, or 322*d*, exceed a number of aggregation values that can be stored in the bucket (e.g., a total number of aggregation values in result store 250 divided by the number of buckets 320). Consider a scenario where bucket 320*b*, stores 10 aggregation results 322*b*. If the limit for a bucket is 10 results, when a next new aggregation result 302 that is mapped to bucket 320*b* is received, then the number of aggregation results 322*b* that may be stored in bucket 320*b* exceeds the storage limitation. An eviction determination may be made to evict one (or more) aggregation results 322*b* from result store 250 to make storage space available for new aggregation result 302. In at least some embodiments, a least recently used determination may be made for the aggregation results in the bucket, such as bucket 320*b*, instead of determining LRU values for all aggregation results in result store 250. One or more of the aggregation values 322*b* in the bucket that were least recently updated (e.g., according to a timestamp stored for each of aggregation results 322*b* indicating the last time at which the aggregation results were updated) may then be evicted 332 from bucket 320*b*. Other reoccurrence probability determinations, such as those based on sort order, may alternatively be applied to select the result(s) to evict from a bucket. By limiting reoccurrence probability determinations to a single bucket when making eviction decisions, the work to determine reoccurrence probabilities for making an eviction selection can be greatly reduced, providing for quick eviction decisions.

Turning back to FIG. 2, aggregation agent 200 may implement (or access) result store 250 in order to maintain aggregation result(s) 252 while executing an aggregation operation on behalf of client 280. Result store 250 may be limited or constrained in order to accommodate a lightweight aggregation agent 200 implementation. For example, if aggregation agent 200 were implemented as part of an on-device controller for a storage drive (e.g., a hard disk drive or other persistent block-based storage device, such as a solid-state drive), then the hardware area and/or resources (e.g., power) available for implementing aggregation agent 200 (including result store 250) may be small relative to the persistent storage capacity of the storage device. In another example, where aggregation agent 220 is implemented on a separate computing device from a storage device, the performance considerations for aggregation agent 200, such as a high-speed scanning and aggregation processing rate, may necessitate a constrained result store 250 to ensure that storage management overhead does not slow aggregation processing. Result store 250 may be implemented by one or more random access memory (RAM) components, such as static RAM (SRAM) or dynamic RAM (DRAM), or on a flash-based storage component, in some embodiments.

Storage device(s) 260 may store data that is accessed in order to perform aggregation operations, such as table 270. Storage device(s) 260 may be implemented as one or more of any type of storage devices and/or storage system suitable for storing data accessible to aggregation agent 200, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In some embodiments, table 270 may be stored and scanned, read, or otherwise obtained from a memory device, such as one or more random access memory (RAM) components like static RAM (SRAM) or dynamic RAM (DRAM), Client 280 may encompass any type of client that submits requests to aggregation agent 200 via client interface 210, including requests for aggregation operations. For example, a given client 280 may encompass an application such as a database application (or user interface thereof), a media application, an office application or any other application that may make use of persistent storage resources, such as storage device(s) 260, to store and/or access one or more data objects, such as table 270. In some embodiments, such an application may include sufficient protocol support (e.g., for a suitable version of Hypertext Transfer Protocol (HTTP) or Internet Small Computer Systems Interface (iSCSI)) for generating and processing aggregation operation requests.

Client 280 may convey aggregation operation requests to and receive responses from aggregation agent 200 via direct connection or network connection. For example, in some embodiments, aggregation agent 200 may be implemented on-device with storage components (as part of a storage device). Client 280 may convey aggregation requests via a bus standard (e.g., peripheral component interconnect express (PCIe)) that facilitates communication from the storage device and host system implementing client 280 (e.g., motherboard implementing a general purpose processor and a memory). In various embodiments, client 280 may be a remote computing system or device that is not directly attached to a computing system or device implementing aggregation agent 200 or storage device(s) 260, and may convey aggregation operation requests via a network that connects aggregation agent 200 and client 280. For example, a network may encompass any suitable combination of networking hardware and protocols necessary to establish network-based-based communications between client 280 and aggregation agent 200. The network include the various telecommunications networks and service providers that collectively implement the Internet or the network may include private networks such as local area networks (LANs), wide area networks (WANs), or storage area networks (SANs) as well as public or private wireless networks.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 6 and described below. In various embodiments, the functionality of a given component (e.g., a component of the aggregation agent) may be implemented by a particular node or may be distributed across several nodes.

Figure 4:
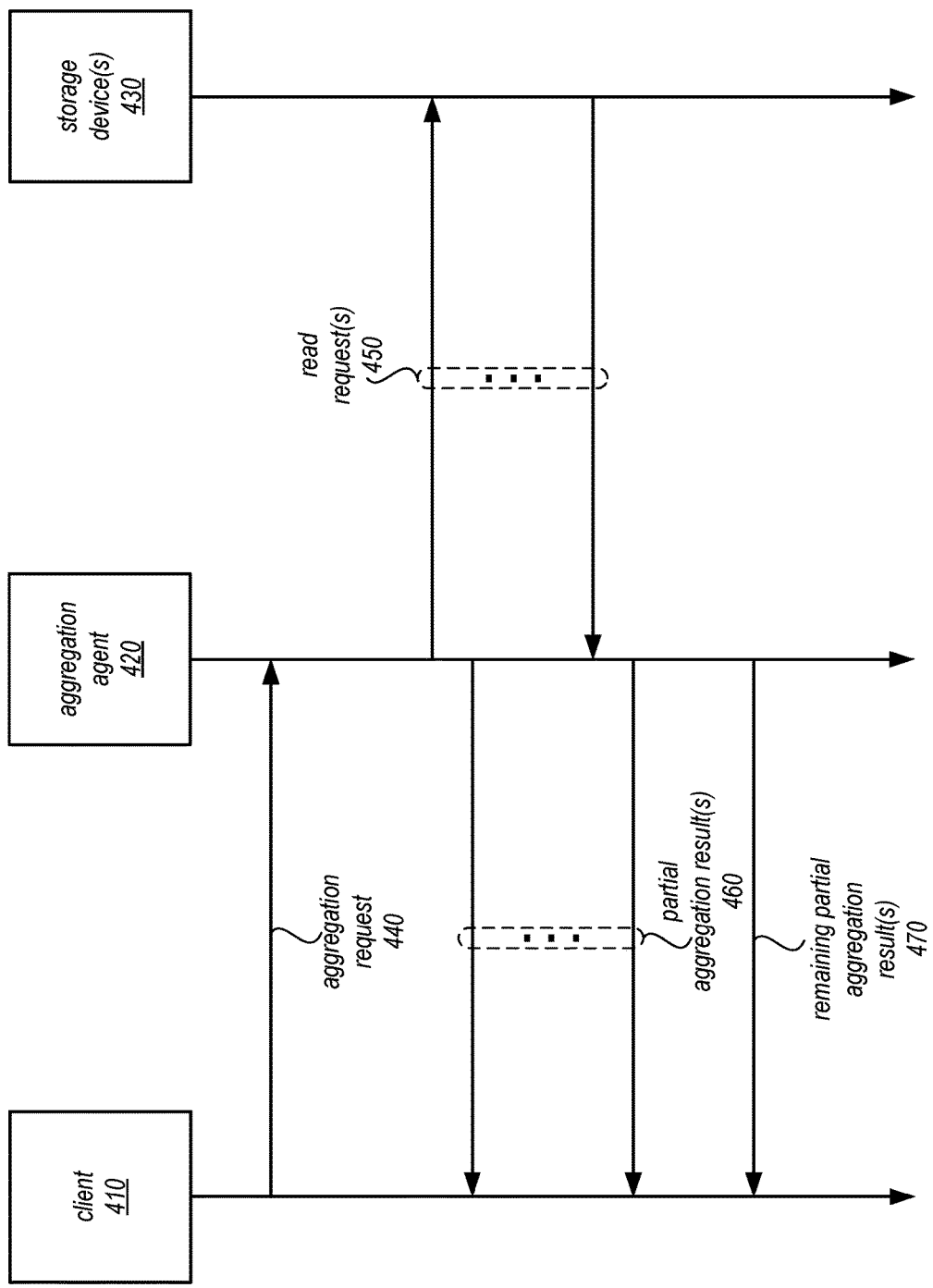
FIG. 4 is a diagram illustrating interactions between a client, aggregation agent, and storage devices to perform an aggregation operation using probabilistic eviction of partial aggregation results, according to some embodiments.

FIG. 4 is a diagram illustrating interactions between a client, aggregation agent, and storage devices to perform an aggregation operation using probabilistic eviction of partial aggregation results, according to some embodiments. Client 410 may be a client, like client 280 in FIG. 2 or aggregation client 140 in FIG. 1, discussed above. Client 410 may submit an aggregation operation request 440 to aggregation agent 420 (similar to aggregation agent 200 discussed above in FIG. 2). Aggregation request 440 may include an identifier (e.g., table name, object id, key value, or file path) for aggregation agent 420 to discover the data upon which the aggregation operation is to be performed. Aggregation request 440 may specify the particular type of aggregation operation, such as a summation, average, standard deviation, minimum or maximum value search, count, first item, last item, median, mode, or any other function applied to associated items in a data object. Aggregation request 440 may specify or define the associative relationship over which the aggregation operation is performed (e.g., defining the common value of items for aggregation).

Aggregation agent 420 may receive aggregation request 440 and initiate one or multiple read request(s) 450 to storage device(s) 430 that store the identified data object. Read request(s) 450 may be performed in a scanning fashion so that read operations are directed to read an entire data object (e.g., every row in a table). In some embodiments, read operations may be performed in accordance with a data format or structure of the data object. For example, a table scan may start with a first or initial row or entry in the table, and process each subsequent row or entry according to the ordering of the rows or entries in the table. As aggregation agent 420 receives the results of read request(s) 450, aggregation agent may apply the aggregation operation to the read data. Partial aggregation results may be generated and stored in a result store. Upon determining that no available storage space for a new partial aggregation result is available, aggregation agent 420 may select partial aggregation result(s) 460 to send back to client 410 according to a determined reoccurrence probability for stored partial aggregation result(s), as discussed above with regard to FIGS. 2 and 3. Once aggregation agent 420 determines that the entire data object has been scanned, any remaining aggregation results not yet provided to client 410 are sent 470 to client 410.

Figure 5:
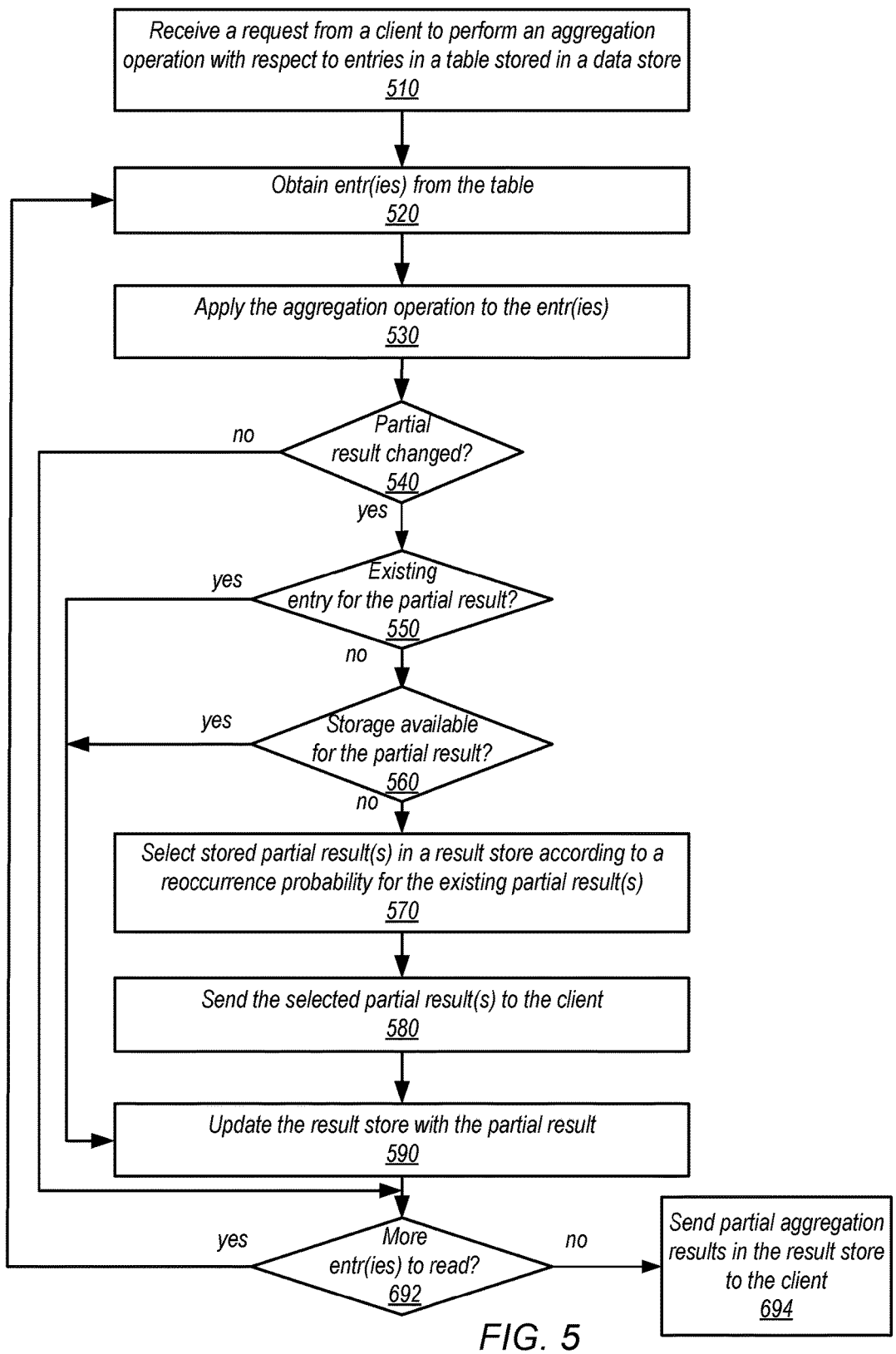
FIG. 5 is a high-level flowchart illustrating methods and techniques to implement probabilistic eviction of partial aggregation results from constrained results storage, according to some embodiments.

Although FIGS. 2-4 have been described and illustrated in the context of aggregation agent, like aggregation agent 200 in FIG. 2 that is separate from storage devices storing scanned data, the various components illustrated and described in FIGS. 2-4 may be easily applied to other data storage systems that provide data aggregation operations on behalf of clients. As such, FIGS. 2-4 are not intended to be limiting as to other embodiments of an aggregation agent or component that performs probabilistic eviction of partial aggregation results from constrained results storage. FIG. 5 is a high-level flowchart illustrating methods and techniques to implement probabilistic eviction of partial aggregation results from constrained results storage, according to some embodiments. Various different systems and devices may implement the various methods and techniques described below, either singly or working together. For example, an aggregation agent, such as described above with regard to FIGS. 2-4 may be configured to implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 510, a request may be received from a client to perform an aggregation operation with respect to entries in a table stored in a data store. The request may be received via a network communication via network connection between the client and a system, component, or device implementing the techniques of FIG. 5, or a direct physical connection, such as a bus connection. The request may specify the identity of the table (e.g., a table name) and may include the appropriate credentials (e.g., username, pass-word, identity token, key, etc.) to access the table. The request may specify the aggregation operation to perform (e.g., summation, average, standard deviation, minimum or maximum value search, count, first item, last item, median, mode, etc.). The request may also specify the associative relationship (e.g., a SQL "GROUP BY" clause) to identify the aggregations to perform.

In response to receiving the request, entr(ies) from the table may be obtained, as indicated at 520, in various embodiments. For example, I/O commands to read individual rows or entries of the table according to an ordering of the table rows or entries or I/O commands to read a batch or group of rows or entries of the table may be performed in order to scan the table in a single pass. As the entr(ies) are received, the aggregation operation may be applied to the entr(ies), as indicated at 530. For example, for a count, summary, or average operation, a new version of the count summary, summary, or average may be generated if the read entr(ies) include a previously seen row with an associated value (e.g., a same user identifier or last name). As indicated at 540, in some circumstances, application of the aggregation operation may not result in a partial result being changed. For instance, if the aggregation operation is a minimum value operation, if the read entr(ies) do not contain value(s) with a value lower than a current minimum value, then no partial result (previously generated) is changed. As indicated by the negative exit from 540, a determination may be made as to whether further entr(ies) in the table need to be read, as indicated at 592, in which case further entr(ies) are read, as indicated by the arrow back to element 520 or the aggregation operation is completed by sending partial aggregation results that remain in the result store to the client, as indicated at 594.

For partial aggregation results that are generated as a result of applying the aggregation operations, a determination may be made as to whether an existing entry in the result store exists for the partial aggregation result, as indicated at 550. For example, if the aggregation operation aggregates by user identifier, then if a partial aggregation result exists in the result store for the same user identifier, then an entry exists for the generated partial result. As indicated by the positive exit from 550, the partial aggregation result may be updated in the result store, as indicated at 590, by updating the existing partial aggregation result to include the generated partial aggregation result (e.g., increasing the count value, changing the summation, deviation, or average value, etc.).

For partial aggregation results that are generated that do not have an existing entry in the result store, a determination may be made as to whether storage space exists in the result store to store the partial aggregation result, as indicated at 560. A result count may be tracked, in some embodiments, and result capacity threshold enforced that limits the number of results to X results in result store. If the partial aggregation result were to cause the result count to exceed X, then storage space is not available. As indicated by the positive exit from 560, if storage space is available, then the result store may be updated, as indicated at 590, by storing the partial aggregation result in an available entry in the result store, as indicated at 590.

For partial aggregation results for which there is no storage space available, then stored partial result(s) in the result store may be selected according to a reoccurrence probability for the existing partial result(s), as indicated at 570. For example, as noted above, a global least recently used (LRU) technique may be applied. Timestamps for last updates to each entry in the result store may be maintained, and upon determining that an eviction is to be made, a time since last updated may be calculated for each entry. The greater the time value, the lower the probability that another update for the aggregation result will occur (according to an LRU reoccurrence probability scheme). Therefore, the lowest probability one (or more) partial aggregation results may be selected. In other embodiments, the LRU scheme may be modified and applied to a particular bucket, such as discussed above with regard to FIG. 4.

Once selected, partial aggregation result(s) may be sent to the client, as indicated at 580. Although not illustrated, in some embodiments a check may be performed to determine whether sufficient space has been made available to store the partial aggregation result. If not, additional partial aggregation results may be selected and sent to the client. The aggregation operation may continue if more entr(ies) remain to be read, as indicated by the positive exit from 590. If, however, no further entr(ies) remain to be read, then any partial aggregation results in the result store may be sent to the client 594 in order to complete the aggregation operation.

The methods described herein may in various embodiments be implemented by any combination of hardware and software. For example, in one embodiment, the methods may be implemented by a computer system (e.g., a computer system as in FIG. 6) that includes one or more processors executing program instructions stored on a computer-readable storage medium coupled to the processors. The program instructions may be configured to implement the functionality described herein. The various methods as illustrated in the figures and described herein represent example embodiments of methods. The order of any method may be changed, and various elements may be added, reordered, combined, omitted, modified, etc.

Figure 6:
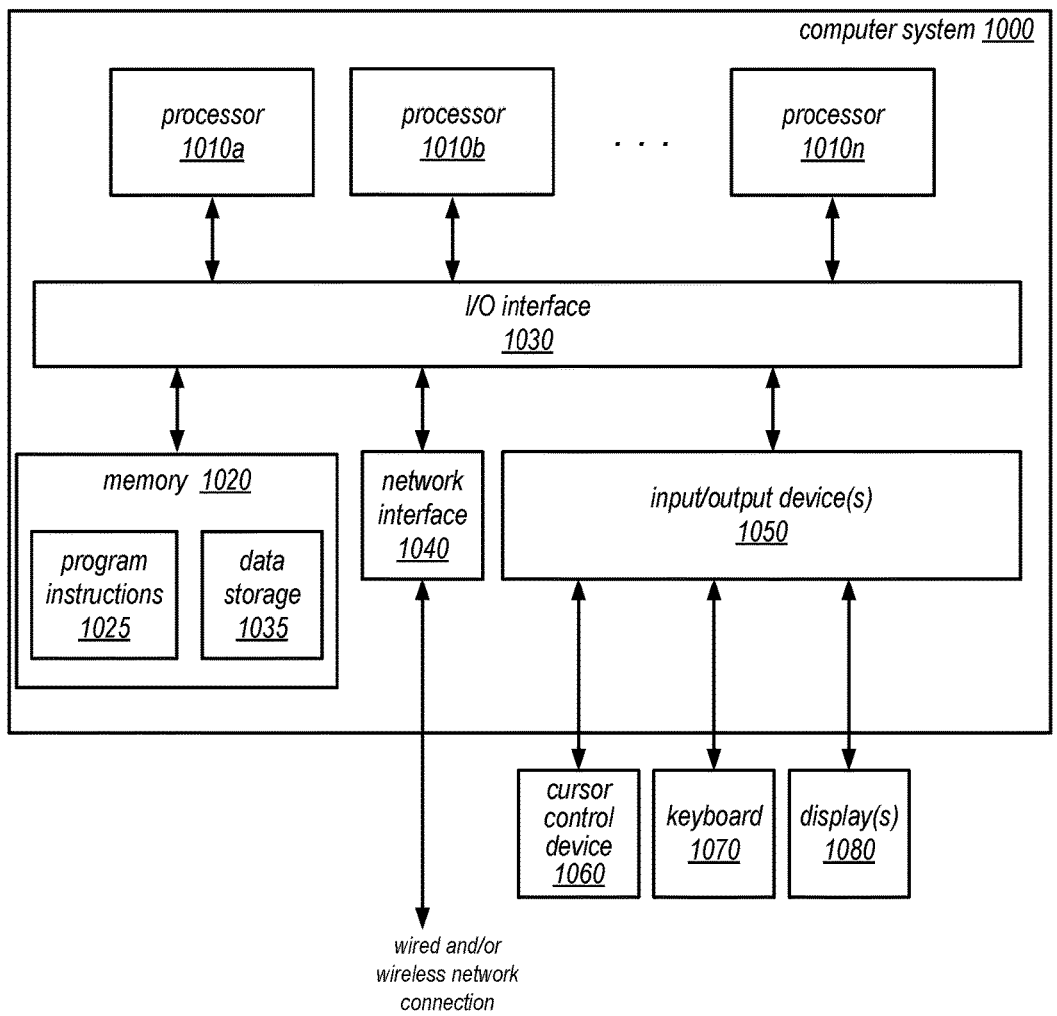
FIG. 6 illustrates an example system configured to implement the various methods, techniques, and systems described herein, according to some embodiments.

Embodiments of probabilistic eviction of partial aggregation results from constrained results storage as described herein may be executed on one or more computer systems, which may interact with various other devices. One such computer system is illustrated by FIG. 6. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 6, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor;
    a memory, storing program instructions, that when executed by the at least one processor cause the at least one processor to perform a method comprising:
        receiving a request from a client to perform an aggregation operation with respect to a plurality of entries in a table stored in a data store;
        accessing the data store table to scan the plurality of entries;
        applying the aggregation operation to one or more entries of the table to generate a partial aggregation result for the aggregation operation with respect to the one or more entries;
        determining that insufficient storage exists in a result store in the memory for the aggregation operation to store the partial aggregation result, wherein the result store stores a plurality of other partial aggregation results for the aggregation operation;
        identifying one or more of the other partial aggregation results in the result store according to a respective reoccurrence probability for the one or more other aggregation results to evict;
        sending the identified one or more other partial aggregation results to the client to make storage available for the partial aggregation result;
        reclaiming storage space of the identified one or more other partial aggregation results in the result store; and
        updating the result store to include the partial aggregation result based on the reclaimed storage space.

2. The system of claim 1, wherein the other partial aggregation results are mapped to respective buckets of aggregation results in the result store, and wherein identifying the one or more of the other partial aggregation results in the result store according to the respective reoccurrence probability for the one or more other aggregation results, comprises:
    identifying one of the buckets mapped to the partial aggregation result; and
    determining one or more of the other partial aggregation results mapped to the identified bucket that were least recently updated, wherein the determined one or more other partial aggregation results that were least recently updated are the identified one or more other partial aggregation results.

3. The system of claim 1, wherein the method further comprises:
    applying the aggregation operation to a different one or more entries of the table to generate another partial aggregation result for the aggregation operation with respect to the different one or more entries;
    determining that sufficient storage exists in the result store to store the other partial aggregation result; and
    updating the result store to include the other partial aggregation result.

4. The system of claim 1, wherein the at least one processor and the memory are implemented as part of a persistent block-based storage device that stores the table.

5. A method, comprising:
    performing, by one or more computing devices:
        receiving a request from a client to perform an aggregation operation with respect to a plurality of entries in a table stored in a data store;
        obtaining one or more entries from the table;
        applying the aggregation operation to the one or more entries to generate a partial aggregation result for the aggregation operation with respect to the one or more entries;
        determining that insufficient storage exists in a result store for the aggregation operation to store the partial aggregation result, wherein the result store stores a plurality of other partial aggregation results for the aggregation operation;
        selecting one or more of the other partial aggregation results in the result store according to a respective reoccurrence probability for the one or more other aggregation results;
        sending the selected one or more other partial aggregation results to the client to make storage available for the partial aggregation result; and
        storing the partial aggregation result in the result store.

6. The method of claim 5, wherein reading the one or more entries from the table is performed as part of a single-pass scan of the entries in the table.

7. The method of claim 5, wherein the other partition aggregation results are mapped to respective buckets of aggregation results in the result store, and wherein selecting the one or more of the other partial aggregation results in the result store according to the respective reoccurrence probability for the one or more other aggregation results comprises:
    identifying one of the buckets mapped to the partial aggregation results; and
    determining one or more of the other partial aggregation results mapped to the identified bucket that were least recently updated, wherein the determined one or more other partial aggregation results that were least recently updated are the selected one or more other partial aggregation results.

8. The method of claim 7, wherein identifying the one bucket comprises determining a hash value for the partial aggregation result and wherein the hash value is mapped to the identified bucket.

9. The method of claim 5, wherein selecting the one or more of the other partial aggregation results in the result store according to the respective reoccurrence probability for the one or more other aggregation results comprises:
determining a respective time since last update for the plurality of other aggregation results in the results store, wherein the respective time since last update for the selected one or more other partial aggregation results is longer than the respective time since last update for remaining other partial aggregation results.

10. The method of claim 5,
upon determining that application of the aggregation operation to the plurality of entries in the table is complete, sending remaining partial aggregation results in the result store to the client.

11. The method of claim 10, further comprising:
receiving another request to perform a different aggregation operation with respect to the table from the client;
performing the reading, the applying, the determining, the selecting, the sending, and the storing as part of executing the other request.

12. The method of claim 5, further comprising:
applying the aggregation operation to a different one or more entries read from the table to generate another partial aggregation result for the aggregation operation with respect to the different one or more entries;
determining that the other partial aggregation result updates one of the other partial aggregation results in the result store; and
updating the one other partial aggregation result in the result store according to the other partial aggregation result in the result store.

13. The method of claim 5, wherein the request to perform the aggregation operation is received and the selected one or more other partial aggregation results are sent via network connection between the client and the one or more computing devices.

14. A non-transitory, computer-readable storage medium, storing program instructions that when executed by one or more computing devices cause the one or more computing devices to implement:
receiving a request from a client to perform an aggregation operation with respect to a plurality of entries in a table stored in a data store;
scanning the table to obtain the plurality of entries;
applying the aggregation operation to one or more entries obtained from the table to generate a partial aggregation result for the aggregation operation with respect to the one or more entries;
determining that insufficient storage exists in a result store for the aggregation operation to store the partial aggregation result, wherein the result store stores a plurality of other partial aggregation results for the aggregation operation;
evicting one or more of the other partial aggregation results in the result store according to a respective reoccurrence probability for the one or more other aggregation results;
sending the selected one or more other partial aggregation results to the client to make storage available for the partial aggregation result; and
storing the partial aggregation result in the result store.

15. The non-transitory, computer-readable storage medium of claim 14, scanning the table to obtain the plurality of entries is performed in a single pass over the table.

16. The non-transitory, computer-readable storage medium of claim 14, wherein the other partition aggregation results are mapped to respective buckets of aggregation results in the result store, and wherein, in evicting the one or more of the other partial aggregation results in the result store according to the respective reoccurrence probability for the one or more other aggregation results, the program instructions cause the one or more computing devices to implement:
identifying one of the buckets mapped to the partial aggregation results; and
determining one or more of the other partial aggregation results mapped to the identified bucket that were least recently updated, wherein the determined one or more partial aggregation results that were least recently updated are the evicted one or more partial aggregation results.

17. The non-transitory, computer-readable storage medium of claim 14, wherein the table is scanned from a memory device.

18. The non-transitory, computer-readable storage medium of claim 14, wherein the aggregation operation is one of a plurality of different types of aggregation operations, wherein the request specifies the type of the aggregation operation.

19. The non-transitory, computer-readable storage medium of claim 14, wherein the program instructions cause the one or more computing devices to further implement:
applying the aggregation operation to a different one or more entries obtained from the table to generate another partial aggregation result for the aggregation operation with respect to the different one or more entries;
determining that sufficient storage exists in the result store to store the other partial aggregation result; and
storing the other partial aggregation result in the result store.

20. The non-transitory, computer-readable storage medium of claim 14, wherein the one or more computing devices are implemented as part of a persistent block-based storage device that stores the table.

* * * * *